United States Patent
Pillot et al.

[15] 3,703,847
[45] Nov. 28, 1972

[54] SUPPORT DEVICE FOR MACHINING WORKPIECES

[72] Inventors: Maurice Pillot, Etupes; Louis Kilian, Montbeliard, both of France

[73] Assignees: Automobiles Peugeot, Paris; Regie Nationale des Usines Renault, Billancourt, France

[22] Filed: July 28, 1970

[21] Appl. No.: 58,844

[30]  Foreign Application Priority Data

Aug. 1, 1969  France......................6926560

[52] U.S. Cl. .................................90/58 C, 308/6 R
[51] Int. Cl. ..............................................B23q 1/04
[58] Field of Search..............90/58 R, 58 C; 308/6 R; 29/568

[56]  References Cited

UNITED STATES PATENTS

| | | | |
|---|---|---|---|
| 3,293,990 | 12/1966 | Deflandre | 90/58 R |
| 2,526,518 | 10/1950 | Turrettini | 308/6 R |
| 3,443,310 | 5/1969 | Burroughs et al. | 29/568 |
| 3,203,314 | 8/1965 | Ried | 90/58 R X |
| 3,345,782 | 10/1967 | Thompson | 308/6 R X |

FOREIGN PATENTS OR APPLICATIONS

| | | | |
|---|---|---|---|
| 1,119,472 | 6/1956 | France | 90/58 R |
| 683,055 | 11/1952 | Great Britain | 90/58 R |

*Primary Examiner*—Andrew R. Juhasz
*Assistant Examiner*—Z. R. Bilinsky
*Attorney*—Burns, Doane, Benedict, Swecker and Mathis

[57]  ABSTRACT

Support device for machining workpieces comprising three parts, namely : a fixed bed, a saddle slidable on the bed in a first direction, a chassis pivotable on the saddle about a first axis orthogonal to the first direction and a table rotatable on the chassis about a second axis orthogonal to the first axis. Means are provided for relatively moving the three parts. Locking means maintain the parts in given positions relative to each other. Weight compensating means are interposed between the saddle and bed and between the table and chassis for compensating variations in the forces exerted by the workpiece on the bed and on the chassis in different regions, for example due to an overhanging position of the workpiece relative to the chassis or bed.

23 Claims, 9 Drawing Figures

SUPPORT DEVICE FOR MACHINING WORKPIECES

The present invention relates to machine tools and concerns more particularly support devices for workpieces to be machined.

It is frequently necessary to machine by means of machine tools of for example the boring and milling, milling and boring, milling and planing or copying milling type, workpieces, such as presstool dies for blanking or forming or press frames, having a weight of as much as 25 metric tons. The mounting and positioning of workpieces of such size present a number of problems which known support devices have been unable to solve in a satisfactory manner.

These support devices comprise a roughly horizontal platform on which are placed movable squares or brackets which define a positioning plane which is roughly orthogonal to the spindle of the machine tool, and a rotary table having a vertical axis allowing the direct clamping of the workpiece or the positioning of squares supporting this piece. Consequently, it is necessary, in order to machine the workpiece in its various planes, to mount it either on the squares or on the rotary table and this requires dismounting and transfers involving considerable and difficult handling owing to the weight of the workpieces.

An object of the invention is therefore to provide a support device for workpieces which overcomes the drawbacks of known devices.

The support device for workpieces to be machined comprises a fixed bed, a saddle mounted on said bed to be slidable in a first direction, a chassis mounted on the saddle to pivot about a first axis roughly orthogonal to said first direction, a table mounted on said chassis to be rotatable about a second axis roughly orthogonal to the axis of said chassis, means for effecting each of said relative movements and locking means for maintaining the various parts of the device in a given position relative to each other.

The combination of these various movements enables the workpieces to be shifted or fed relative to the tool without necessity to transfer or dismount them so that it is possible to machine all their faces except the face by which they are fixed.

Further features and advantages of the invention will be apparent from the ensuing description with reference to the accompanying drawings.

Figure 1:
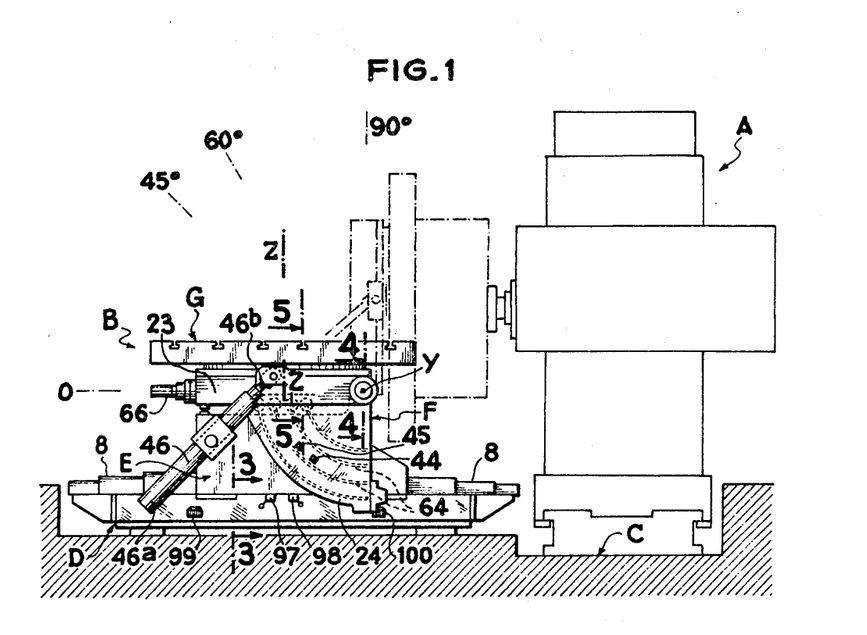
FIG. 1 is a diagrammatic assembly view in elevation of the device according to the invention and an associated machine tool.

In the drawings:

FIG. 1 shows a machine tool A and a support device B, according to the invention, placed on a platform C constituted by a concrete block. The machine tool A can be, as indicated hereinbefore, a boring-milling, a planing-milling, or a reproducing milling machine or any other machine tool.

The support device B for the workpieces to be machined comprises four main parts, namely : a bed D, a carriage or saddle E, a chassis F and a table G. The saddle E is mounted on the bed D to be slidable in a horizontal direction X—X. The chassis F is mounted on the saddle E to be pivotable about a horizontal axis Y—Y, orthogonal to the direction X—X. The table G is mounted on the chassis F to be pivotable about an axis Z—Z perpendicular to the plane of the chassis and orthogonal to the axis Y—Y.

The various possible movements of the tool-carrying head of the machine A are conventional and have not be illustrated in the drawing.

There will now be described in more detail the construction of the main parts constituting the device according to the invention and the manner in which they are assembled. The control devices controlling the movements, the locking and the lightening will be described later.

Figure 3:
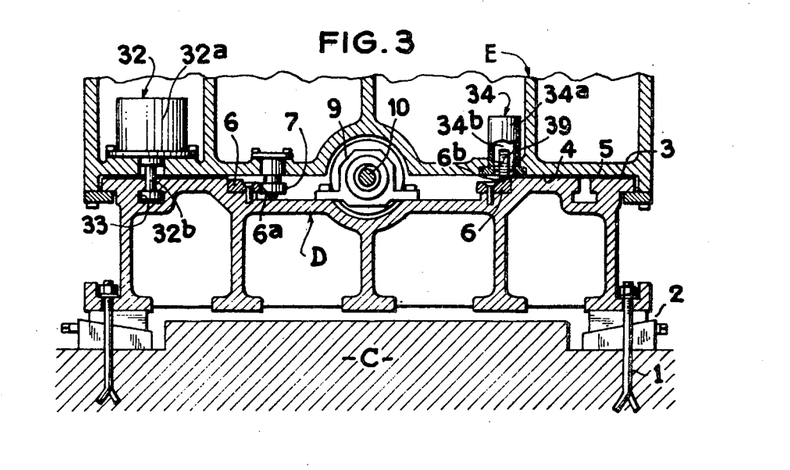
FIG. 3 is a sectional view, taken along line 3—3 of FIG. 1, showing how the saddle is mounted on the bed, it being offset to show the various mechanisms provided between the saddle and the bed.

As can be seen in FIG. 3, the bed D is adapted to support the whole of the device and guide the saddle E in its travel in the direction X—X. This bed is directly secured to the ground in a concrete block C by rods 1 and screwjacks 2 whereby the bed can be set in a perfectly horizontal plane.

The cast iron bed has strengthening ribs and defines slideways 3 on which the saddle E bears, this saddle carrying on the face 4 thereof in contact with the slideways a bronze fitting 5. The bed D also carries two strips 6 of hardened steel the lateral faces 6 of which co-operate with rolling bearings 7 which act as guides and are mounted on eccentrics and carried by the lower wall 4 of the saddle E. These adjustable guide rolling bearings permit an exact centering of the saddle and ensure with high precision the orthogonal relationship between the axis Y—Y and the direction of travel X—X. These guide rolling bearings also permit the adjustment of the prestressing of the lateral guiding of the saddle relative to the bed.

Figure 2:
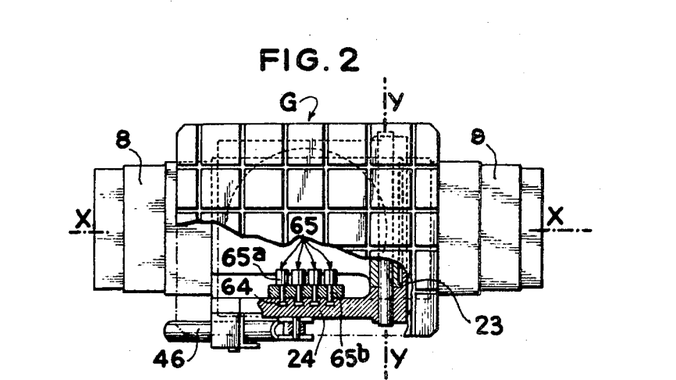
FIG. 2 is a plan view, with a part cut away, of the device shown in FIG. 1.

It will be seen from FIGS. 1 and 2 that the slideways 3 are protected by telescopic sheets 8 which however allow access to the slideways. The bed D carries, in the median part thereof as concerns both the longitudinal and transverse directions, a fixed nut 9 which cooperates with a leadscrew 10 driven in rotation by a servomotor 11 (shown in the assembly diagram in FIG. 9), this assembly causing the saddle to move relative to the bed.

Figure 4:
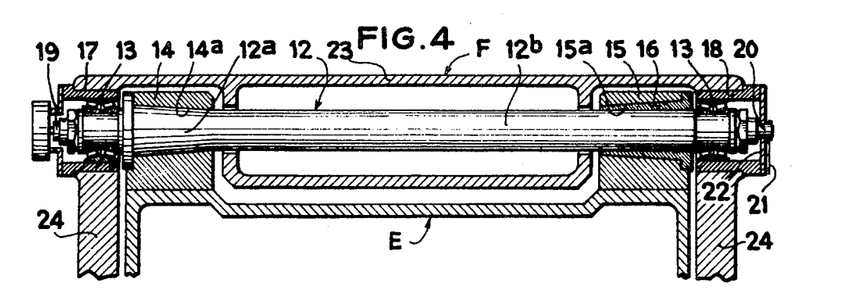
FIG. 4 is a sectional view, taken along line 4—4 of FIG. 1, showing how the pivotable chassis is mounted on the saddle.

There will now be described, with reference to FIG. 4, the manner in which the chassis F is mounted on the saddle E for pivotal movement about the axis Y—Y. The saddle E carries in its upper part a fixed shaft 12 carrying at both ends rolling bearings 13 having tapered rollers which are arranged in pairs in opposed relation. The shaft 12 is mounted in two supports 14, 15, having tapered inner bearing faces 14a, 15a, so as to achieve a particularly rigid assembly. The shaft has a tapered shape in the part 12a thereof in the region of the support 4, this shape corresponding to the inner shape of the support. To facilitate its disassembly, the shaft has a cylindrical shape in its part 12b between the two supports and in the region of the support 15. A tapered bushing 16 is interposed between the part 12b of the shaft and the tapered inner bearing face of the support 15, it being fixed to the support 15 by releasable fixing means (not shown). The outer rings of the four rolling bearings 13 are integral with sleeves 17, 18 fixed to the chassis F. Two bearing faces 19, 20 provided at the ends of the shaft constitute reference faces for aligning with precision the pivot axis Y—Y of the chassis on the saddle. The shaft 12 carries at the right end thereof (as viewed in FIG. 4) an index or pointer 21 which co-operates with a graduation carried by a plate 22 integral with the chassis. This index affords a first indication of the value of the pivot angle of the chassis.

As can be partly seen in FIGS. 1, 2, 4 and 5, the chassis F comprises a platform 23 and two side walls 24 which are disposed on each side of the saddle E. The platform 23 defines a support or guide face 25 which is roughly horizontal when viewed in FIG. 1 and on which the table G is mounted to rotate about the axis Z—Z. This table is connected to the chassis by pivot means 26 comprising a large-size rolling bearing which takes up play or clearance (FIG. 5), a guide strip 27 and four retaining elements, such as 28.

Figure 5:
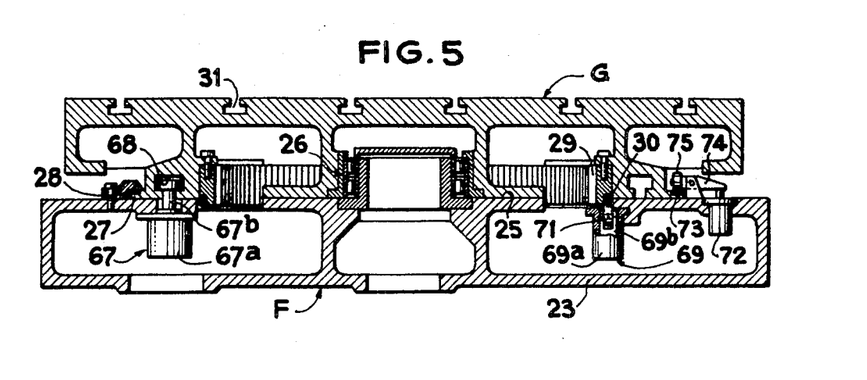
FIG. 5 is a sectional view, taken along line 5—5 of FIG. 1, showing how the table is mounted on the chassis, it being offset to show the various mechanisms provided between the table and the chassis.

The table carries a gear wheel having internal teeth 29 which is part of the mechanism for rotating the table about the axis Z—Z. The gear wheel 29 carries a ring 30 of hardened steel which cooperates with a lightening device adapted to counter the effect of the weight of the workpiece, which will be described hereinafter. The table G comprises in the known manner T-slots 31 for clamping the workpiece to be machined.

There will now be described the various control devices for producing the various relative movements, the locking and possibly the lightening between respectively the saddle E and the bed D, the chassis F and the saddle E, and the table G and the chassis F.

The saddle E is made to move relative to the bed in the direction X—X by a servomotor 11 which drives the leadscrew 10 as indicated hereinbefore. This mechanism is provided for feeding the workpiece at rates which are variable as desired within two ranges: a rapid feed of 90-3,600 mm per minute or a slow feed of 1.2–410 mm per minute (namely 0.02 mm per second). The saddle can be positioned relative to the bed in increments of minimum value of the order of 0.006 mm.

Figure 6:
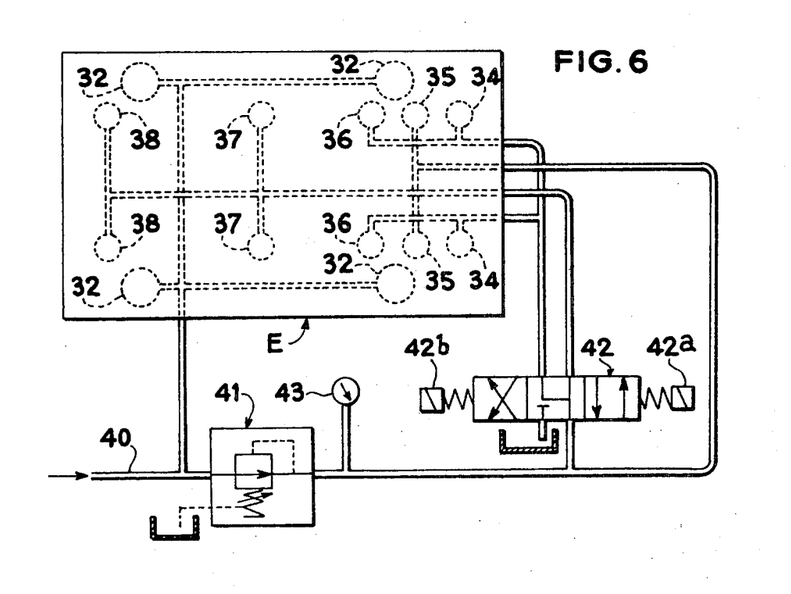
FIG. 6 is a diagram representing the hydraulic supply circuit for the unlocking and lightening means between the saddle and the bed.

The means for locking the saddle relative to the bed in a given position are shown in FIGS. 3 and 6. These means comprise four adjustable hydraulic jacks 32 having a cylinder 32a carried by the saddle and a piston rod constituting a pull rod 32b received in a T-slot 33. These jacks normally apply the saddle against the bed under the action of resiliently yieldable means (not shown) and unlock or release the saddle when fed with fluid under pressure. The position of these four fluid jacks 32 in plan can be seen in FIG. 6.

A lightening device is also provided between the saddle and the bed which in particular compensates the forces exerted by the load constituted by a workpiece especially according to the position of the pivotable chassis and of the work-carrying table. This device comprises five pairs of fluid jacks 34, 35, 36, 37, 38 whose positions in plan are shown in FIG. 6, the cylinder of each jack, for example the cylinder 34a, being carried by the saddle E (FIG. 3). The piston rod, such as 34b, of these jacks constitutes a fork carrying a rolling bearing 39 which has a horizontal axis of rotation and bears against a rolling face constituted by the upper face 6b of the hardened steel strip 6.

The unlocking jacks 32 and the compensating jacks 34 to 38 are fed with fluid under pressure by way of a conduit 40 (FIG. 6), directly as concerns the jacks 32, and through a pressure reducer 41 and an electrically controlled distributing valve 42 having three positions as concerns the motors 34 to 38. A pressure gauge 43 is provided in the supply conduit of the jacks. The position of the slide of the slide valve is controlled through two electromagnets 42a, 42b by two position detectors 44, 45 shown in FIG. 1 mounted on the saddle and actuated by the pivotable chassis. This control device is incorporated in the general hydraulic circuit shown in FIG. 9 and will be described in more detail hereinafter.

The mechanism for pivoting the chassis F with respect to the saddle E comprises, disposed symmetrically on each side of the saddle, two hydraulic jacks 46 whose cylinders 46a are integral with the saddle and whose piston rods 46b are connected to the chassis. These two jacks are supplied with fluid in accordance with the hydraulic diagram shown in FIG. 8.

Figure 8:
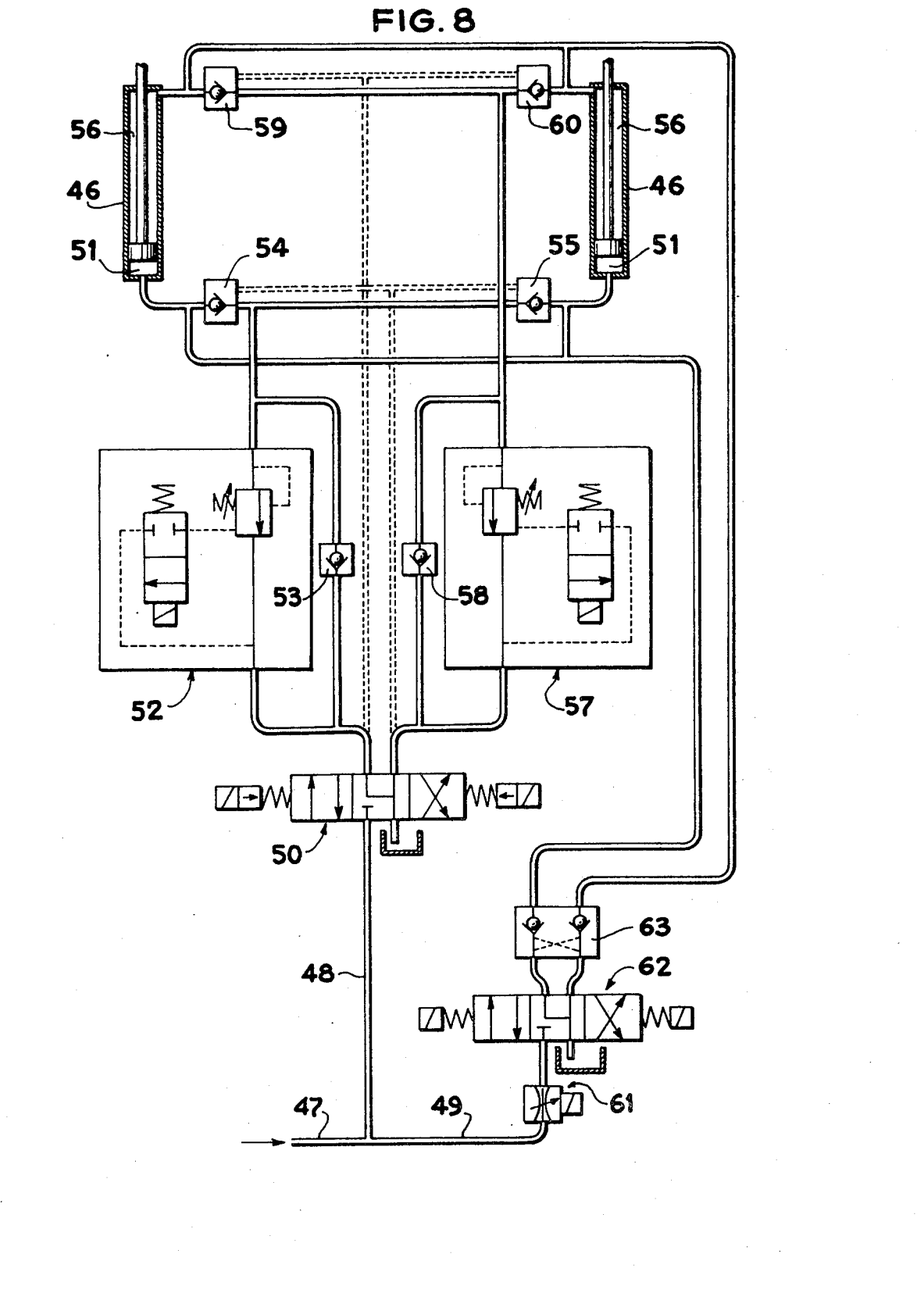
FIG. 8 is a diagram representing the hydraulic control circuit for pivoting the chassis relative to the saddle.

The jacks 46 are controlled by a conduit 47 through two circuits connected in parallel, namely a high-flow circuit 48 pertaining to rapid feed and a variable low-flow circuit 49 for positioning. The rapid feed circuit comprises a three-position distributing valve 50 having an electric control. The chambers 51 of the jacks 46 are connected to the valve 50 through a path which comprises, connected in parallel, an electrically controlled adjustable retaining valve 52 and a check valve 53 and two check valves 54, 55 which are pilot controlled and directly connected to the jacks and ensure that the circuit is safe and perfectly sealed.

The other chambers 56 of the jacks 46 are connected to the distributing valve 50 through a path which comprises, connected in parallel, an adjustable retaining valve 57 having an electric pilot control and a check valve 58 and two piloted check valves 59 and 60. The pilot control of the valves 52, 57 is effected by two position detectors 44, 45 mounted on the saddle and actuated by the chassis when it pivots.

The low-flow positioning circuit 49 comprises mainly a flow regulator 61 controlled electrically, a three-position rapid-response distributing valve 62 controlled electrically which directs the flow of fluid directly to the chambers 51 and 52 of the jacks 46 behind the piloted check valves 54,55–59,60 respectively. A box 63 having piloted check valves at the outlet of the distributing valve ensures that the positioning circuit 49 is perfectly sealed.

Locking means (FIGS. 1 and 2) are provided between the chassis and the saddle. The side walls 24 of the pivotable chassis each comprises on their inner face four T-slots 64 which extend along arcs of a circle centered on the pivot axis Y—Y. The saddle carries on its upper face two groups of four fluid jacks 65 whose cylinders 65a are integral with the saddle and whose piston rods 65b constitute pull rods whose ends are received in the T-slots 64. As in the case of the locking between the saddle and the bed, these rods, when actuated by resiliently yieldable means (not shown), normally lock the chassis with respect to the saddle, unlocking or release being achieved when fluid under pressure is supplied thereto.

The work-carrying table G is rotated about the axis Z—Z by a servomotor 66 which drives a leadscrew or worm meshed with a worm wheel having a vertical axis, this wheel being integral with a gear wheel which is meshed with the gear wheel 29 having internal teeth. This mechanism comprises a device for taking up play in the teeth and is conventional and therefore has not been shown in detail.

Figure 7:
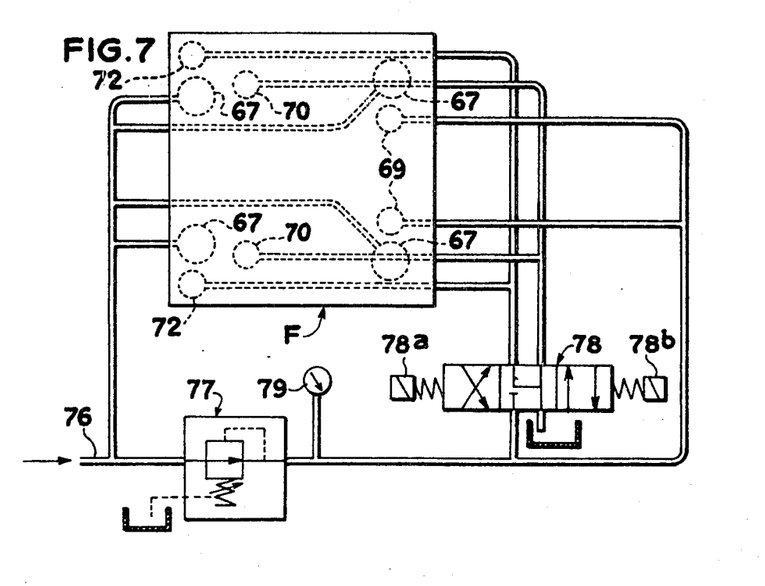
FIG. 7 is a diagram representing the hydraulic supply circuit for the unlocking and lightening means and the weighting means between the table and the chassis.

A locking mechanism similar to that between the saddle and the frame (FIG. 5) is provided between the table G and the chassis F. This mechanism comprises four fluid jacks 67 whose positions in plan are indicated in FIG. 7. The cylinders 67a of these jacks are integral with the chassis and their piston rods constitute pull rods 67b engaged in circular T-slots 68 provided in the lower part of the table. These rods normally lock the table relative to the chassis, unlocking or release being achieved only when the jacks 67 are fed with hydraulic fluid under pressure.

A lightening or compensating device, similar to that between the saddle and the bed (FIGS. 5 and 7), is provided between the table G and the chassis F. This compensating device comprises two pairs of jacks 69, 70 whose positions in plan are shown in FIG. 7. The cylinders of these jacks such as the cylinder 69a shown in FIG. 5, are integral with the chassis and their piston rods 69b constitute forks in which are mounted for rotation about horizontal axes roller or needle bearings 71 whose outer ring can be brought in contact with the hardened steel ring 30 carried by the gear wheel 29 of the table. Further, two jacks 72 effect an opposite compensation, namely a weighting, whose purpose will be explained hereinafter, and act on a ring of hardened steel 73 through a lever 74 (which doubles the force exerted) and a needle bearing 75.

The unlocking jacks 67, the compensating jacks 69, 70 and the compensating jacks 72 are supplied with fluid under pressure in accordance with the diagram shown in FIG. 7 by a conduit 76, directly as concerns the jacks 67, and through a pressure reducer 77 and a three-position distributing valve 78 having an electric control as concerns the jacks 69, 70 and 72. The distributing valve 78 has two electromagnets 78a, 78b and is controlled by the two position detectors 44, 45 actuated by the chassis. A pressure gauge 79 is also provided.

The general diagram of the hydraulic circuit of the device according to the invention will now be described with reference to FIG. 9. This hydraulic circuit comprises a tank 79, a pump 80 driven by a motor 81 and supplying a main conduit 82 with hydraulic fluid under pressure. Two filters 83, 84 are respectively provided on the inlet side and outlet side of the pump 80. A discharge valve 85 is provided on the outlet side of the pump and permits excess fluid to return to the tank by way of another filter 86. Connected to the main conduit 82 in parallel are three conduits 87, 88, 89 which respectively supply the circuits 90, 91, 92 corresponding to the feeding of the saddle with respect to the frame, the rotation of the table with respect to the chassis and the pivotal movement of the chassis with respect to the saddle. These three circuits are very similar in design, as can be seen in the diagram shown in FIG. 9.

Each of the three circuits 90, 91, 92 connected in parallel supplies the drive mechanism, the unlocking mechanism, and possibly the compensating mechanism of each assembly, namely the saddle-bed assembly, the chassis-saddle assembly and the table-chassis assembly. The circuit 90 comprises an electrically-controlled two-position selecting valve 93 returned by spring and pressure which is normally in the position shown in the drawing in which there is no supply to the rest of the circuit. Downstream of this valve is a sequence valve or pressure regulating valve 94 which stops the pressure so that, when the latter reaches a given value, the unlocking fluid jacks 32 and the pressure reducer 41 of the compensating jacks are supplied with fluid. Downstream of this sequence valve 94 is a distributing valve 95 connected to the servomotor 11 which controls the feed of the saddle with respect to the frame. Connected between the selecting valve 93 and the sequence valve 94 is a manostat 96 which is adapted to measure and signal the pressure and then authorize operation of the servomotor 11 when the pressure reaches a sufficient value. This manostat constitutes safety means.

The maximum feed of the saddle with respect to the bed is determined by two position detectors 97, 99 which co-operate with cams 99, 100 (FIG. 1). The circuit 91 which controls the rotation of the table comprises an electrically-controlled two-position selecting valve 101 which in its normal position cuts off the supply of the circuit 91; a sequence valve 102 which establishes in the circuit a given pressure sufficient for supplying the unlocking jacks 67 and the pressure reducer 77 of the compensating jacks 69, 70 and compensating jacks 72; a distributing valve 103 connected to the servomotor 66 which controls the rotation of the saddle; and a manostat 104 which is adapted to measure and signal the pressure and authorize actuation of the servomotor 66.

The circuit 92 which controls the pivoting of the chassis comprises a normally-closed two-position selecting valve 105; a sequence valve 106 which establishes a given pressure in the circuit sufficient to actuate the unlocking jacks 65; and a manostat 107 which performs the same function as the manostats 96 and 104 and authorizes the actuation of the distributing valves 50, 62 respectively controlling the circuits for effecting the rapid feed and the positioning of the chassis with respect to the saddle.

This assembly is completed by a control unit which will not be described in the present description.

There will now be described the operation of the device according to the invention, and in particular the movements of the various parts constituting this device, from a position in which these various parts are rendered integral by the various locking mechanisms.

There will first be described the feeding of the saddle E with respect to the frame D with reference in particular to FIGS. 3, 6 and 9. To effect such a movement, the selecting valve 93 is energized (FIG. 9) so as to put it in the position for supplying fluid to the circuit. The sequence valve 94 creates, in the part of the circuit located upstream of the valve, the establishment of a pressure which supplies the unlocking mechanism and the compensating mechanism. The four unlocking jacks 32 (FIG. 6) are supplied and this cancels out the force for locking the saddle E with respect to the frame D exerted by the pull rods 32b.

It will be recalled that the compensating mechanism provided between the bed D and the saddle E is adapted to compensate the variable forces due to the load carried by the table G. Indeed, these forces are essentially variable as a function of the pivotal position of the chassis F and of the table G relative to the saddle E. The resultant of these compensating forces opposes the variable load both in intensity and in position. This compensation is controlled by the pressure reducer 41 and the pressure gauge 43 (FIG. 6). The three-position distributing valve 42 controlled by the two position detectors 44, 45 shown in FIG. 1 determine, in accordance with the pivotal position of the chassis F and of the table G, the jacks which exert the lightening or compensating forces:

a. For a position of the table and chassis between 0° and 45° (FIGS. 1 and 6), the detector 44 energizes the electromagnet 42a of the distributing valve 42 and shifts the slide of this valve in such manner that the lightening or compensation is effected on the three pairs of motors 35, 37 and 38 arranged over the lower face of the saddle E.

b. When the inclination of the saddle and chassis is between 45° and 60°, the distributing valve 42 is in the neutral position shown in FIG. 6 and the compensation is effected by the five pairs of jacks 34 to 38.

c. When the inclination of the table and chassis is between 60° and 90°, the detector 45 energizes the electromagnet 42b of the distributing valve 42 and shifts the slide of this valve in such manner that the compensation is effected through the three pairs of jacks 34, 35 and 36 adjacent the front of the saddle E.

It may be mentioned that the unit force of each lightening or compensating jack 34 to 38 can be regulated between 0 and 4400 daN, for example in accordance with the value of the load carried by the table G.

As the unlocking and compensation are carried out automatically according to the pivotal position of the chassis and table, the servomotor 11 is supplied for operation in the desired direction so as to shift the saddle in one direction or the other by placing the distributing valve 95 in the corresponding position. As already mentioned, the saddle is shifted with respect to the bed by the servomotor 11 through an assembly comprising a lead screw 10 and nut 9. The feed rates it is possible to obtain, in accordance with the chosen embodiment, from the feed mechanism have already been indicated.

There will now be described with reference to FIGS. 5, 7 and 9 the manner in which the table G is rotated with respect to the chassis F about the axis Z—Z. As in the preceding case, the circuit 91 is supplied with fluid by energizing the selecting valve 101 in such manner as to place it in its open position. The pressure which is established upstream of the sequence valve 102 is adapted to control the unlocking, lightening and weighting mechanisms (FIG. 7). The four unlocking jacks 67 are supplied with fluid and this annuls the locking force exerted by the pull rods 67b and disconnects the table G from the chassis F.

As in the case of the lightening on the bed, the lightening force exerted by the jacks 69, 70 and the weighting force exerted by the jacks 72 between the table G and the chassis F depends on the inclination of the chassis and table with respect to the rest of the device. These compensations in one direction and the other are adapted to oppose the variable pivoting torque exerted by the load clamped to the table. The pivotal position of the chassis and table determines which jacks must produce a lightening and/or weighting through the distributing valve 78 having two electromagnets 78a, 78b, this valve being controlled by the two position detectors 44 and 45. Thus:

When the inclination of the table is between 0° and 45° (FIG. 1), the detector 44 energizes the electromagnet 78a. The lightening compensation is then effected by the two pairs of jacks 69 and 70 arranged on the chassis F.

When the inclination of the chassis is between 45° and 60°, the distributing valve 78 is in the neutral position. Only the two jacks 69 which are the nearest to the pivot shaft 12 are supplied with fluid and exert a lightening effect.

When the inclination of the chassis is between 60° and 90°, which corresponds to the position in which the pivotating torque is the highest, the detector 45 energizes the electromagnet 78b. The distributing valve 78 is then placed in such position that the jacks 69 are still supplied with fluid to produce the lightening effect, the two jacks 72 also being supplied and exerting a weighting effect through levers, such as the lever 74 (FIG. 5), and needle bearings 75 which bear against the hardened steel ring 73.

As in the case of the bed and saddle, the unit force of each lightening jack and weighting jack can be adjusted between 0 and 4400 daN.

The table can be rotated about the axis Z—Z continuously at a speed varying from 0.00072 rpm to 0.257 rpm for a continuous machining, or shifted angularly for positioning by increments whose minimum value is, for example, 0.0015°.

Figure 9:
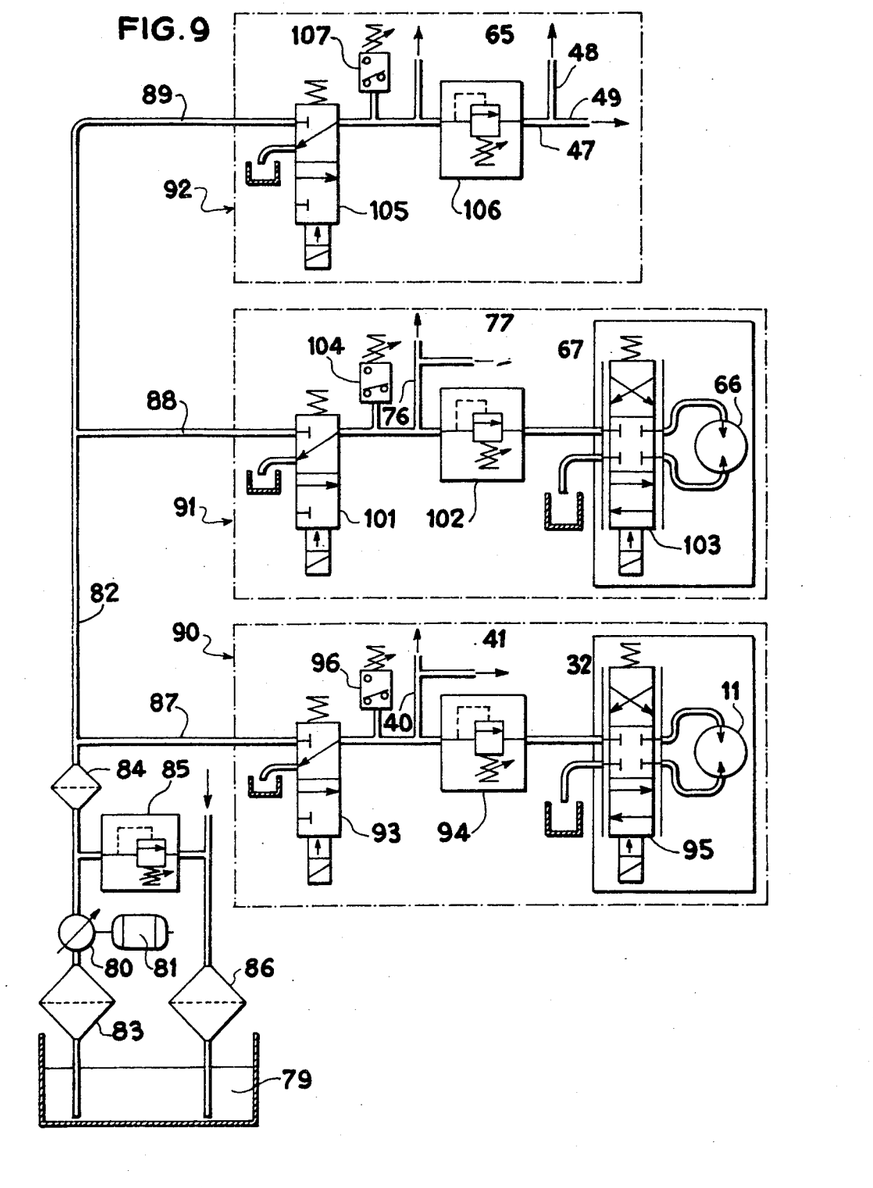
FIG. 9 is a general diagram of the hydraulic circuit of the device.

The pivoting of the assembly consisting of the chassis F and table G carrying the workpiece is controlled hydraulically in the following manner (FIGS. 8 and 9). With the valve 105 placed in the position for supplying fluid to the circuit, there is established upstream of the sequence valve 106 sufficient pressure to supply the jacks 65 and thus annul the locking force exerted by the pull rods 65b (FIG. 2).

There will first be explained the operation of the circuit 48 for rapidly pivoting the chassis F with respect to the saddle E. Assuming that this chassis and the table are in the position shown in FIG. 1, that is, in the horizontal position, to pivot the chassis in the upward direction it is necessary to energize the distributing valve 50 in such manner that the slide of this valve moves toward the right as viewed in FIG. 8. The hydraulic fluid under pressure then passes through the valve 50 and reaches the chambers 51 of the two jacks 46 through check valves 53 and 54, 55. The fluid contained in the chambers 56 of the jacks can escape and return to the tank through check valves 59, 60 bearing in mind that these valves are piloted and maintained open.

At the beginning of this movement and as long as the inclination of the chassis is less than 45°, the position detector 44 (FIG. 1) controls the electromagnet of the valve 57 in such manner that the latter is open and the fluid which escapes from the chambers 56 is not subjected to a retaining counter-pressure. When the inclination of the chassis exceeds 45°, the retaining valve 57 is no longer piloted and acts as a function of this adjustment so as to exert a counter-pressure which tends to retain the pivoting assembly and oppose the torque exerted by the load.

Likewise, in the course of the downward movement, for example from the vertical position shown in dot-dash line in FIG. 1, if the slide of the distributing valve 50 is shifted toward the left, as viewed in FIG. 8, the chambers 56 of the jacks 46 are supplied with fluid under pressure through the valves 58 and 59, 60, the fluid being able to escape from the chambers 51 since the check valves 54 and 55 are piloted and maintained open. When the inclination of the table is between 60° and 90°, the detector 45 controls the electromagnet of the valve 52 so that this valve opens and the fluid contained in the chambers 51 of the jacks is not subjected to a counter-pressure. Beyond this inclination of 60°, that is between 0° and 60°, the retaining valve 52 is no longer piloted and exerts a regulated counter-pressure which tends to oppose the pivoting movement of the movable assembly.

Thus, it can be seen that, owing to this device, a perfectly reliable operation is ensured since a retention is automatically exerted when the load tends to having a driving effect.

The positioning circuit 49 operates in a simple manner: the flow regulator 61 controls a low flow, the three-position distributing valve 62 controls the fluid flow either in the direction of chambers 51 or in the direction of the chambers 56, directly behind the check valves 54, 55, 59 and 60.

By way of example, itmay be mentioned that the speeds of the pivoting movement achieved through the circuit 48 and the circuit 49 are respectively of the order of 90° per minute in respect of the rapid-feed circuit 48 and from 9° per minute to 0.12° per minute (namely 0.002° per second) in respect of the positioning circuit 49. The angular position of the pivoting assembly is controlled by a sighting arrangement whose reading precision is for example to within 0.01°.

The device is completed by a measuring and display unit (not shown) which enables the exact position of the various moving parts of the device to be measured and indicated to the user. The angular positions of the pivotable chassis F and table G are determined for example to within 0.01° whereas the position of the saddle with respect to the bed is measured with a precision of, for example, 0.01 millimeter.

It will be clear from the foregoing description of the operation that the workpiece support device according to the invention permits positioning relative to the tool-carrying head of the machine a very heavy workpiece, weighing for example as much as 25 metric tons. These movements of the workpiece — which result from the combination of three feeds: a transverse feed parallel to the axis X—X, a pivotal feed about the axis Y—Y and a rotational feed about the axis Z—Z — permits the workpiece to be brought into any required position, without dismounting or transferring the workpiece, for machining it on all its faces except the face in contact with the table G. This device is therefore most convenient and is a considerable improvement over known support devices.

All the driving, locking, lightening and weighting mechanisms are so designed as to guarantee reliable operation.

Having now described our invention what we claim and desire to secure by Letters Patent is:

1. A support device for machining a workpiece comprising a first pair of parts consisting of a first part defining a fixed bed, a second part defining a saddle, interengaging guide means interposed between the saddle and the bed for supporting the saddle on the bed for movement in a first direction, a second pair of parts consisting of a third part defining a chassis mounted on the saddle to pivot about a first axis substantially orthogonal to said first direction and a fourth part defining a table for receiving and holding the workpiece, interengaging guide means interposed between the table and the chassis for supporting the table on the chassis for rotation about a second axis substantially orthogonal to said pivot axis of the chassis, means for relatively moving said parts, releasable locking means for maintaining said parts in desired positions relative to each other, a plurality of hydraulically operated weight compensating means in a plurality of spaced-apart regions and interposed between parts of one pair of said pairs of parts, each weight compensating means being capable of producing a relative steady force between the parts of said one pair of parts, and hydraulic means for independently varying said relative force produced by each of the compensating means substantially as a function of forces exerted substantially in said regions through said guide means of said one pair of parts due to the weight and position of the workpiece relative to said one pair of parts so as to substantially balance said forces exerted by the workpiece.

2. A support device as claimed in claim 1, wherein said weight compensating means comprise lightening means which comprise groups of fluid cylinders fixed to one of the parts of said one pair of parts and having piston rods and rolling elements carried by the piston rods and adapted to bear and roll against a rolling face carried by the other of the parts of said one pair of parts, said relative forces produced by said lightening means being forces biasing the parts of said one pair of parts away from each other.

3. A support device as claimed in claim 2, comprising five pairs of lightening fluid cylinders between the parts of said pair of parts.

4. A support device as claimed in claim 1, comprising between the saddle and the bed a plurality of lateral guiding and positioning means comprising rolling elements carried by the saddle and bearing against a guide face carried by the bed, said rolling elements being adjustably mounted on eccentrics so as to permit adjustment of pre-stressing of the lateral guiding of the saddle in its travel and permit a precise adjustment of orthogonality between said first axis and said first direction.

5. A support device for machining a workpiece comprising a first part defining a fixed bed, a second part defining a saddle, interengaging guide means interposed between the saddle and the bed for supporting the saddle on the bed for movement in a first direction, a third part defining a chassis mounted on the saddle to pivot about a first axis substantially orthogonal to said first direction, a fourth part defining a table for receiving and holding the workpiece, interengaging guide means interposed between the table and the chassis for supporting the table on the chassis for rotation about a second axis substantially orthogonal to said pivot axis of the chassis, means for relatively moving said parts, releasable locking means for maintaining said parts in given positions relative to each other, and a plurality of hydraulically operated weight compensating means in a plurality of spaced-apart regions and interposed between the chassis and the table, each weight compensating means being capable of producing a relative steady force between the table and chassis, and hydraulic means for independently varying said relative force produced by each of the compensating means substantially as a function of forces exerted substantially in said regions through said guide means of the table and chassis due to the weight and position of the workpiece relative to said table and chassis so as to substantially balance said forces exerted by the workpiece.

6. A support device as claimed in claim 5, wherein said weight compensating means comprise lightening means comprising groups of fluid jacks fixed to one of the parts consisting of the chassis and the table and having piston rods and rolling elements carried by the piston rods and adapted to bear and roll against a rolling face carried by the other of said parts consisting of the chassis and the table, said relative forces produced by said lightening means being forces biasing the table and chassis away from each other.

7. A support device as claimed in claim 5, wherein said weight compensating means comprise at least two pairs of lightening fluid jacks interposed between the chassis and the table, said relative forces produced by said lightening means being forces biasing the table and chassis away from each other.

8. A support device as claimed in claim 6, wherein said weight compensating means comprise weighting means which comprise a plurality of fluid jacks fixed to one of the parts consisting of the chassis and the table and having piston rods, levers pivotably mounted on said one of said parts consisting of the chassis and the table and having first end portions respectively connected to the piston rods and second end portions, rolling elements respectively carried by the second end portions and a rolling face on the other of said parts consisting of the table and the chassis ,said rollers bearing against said rolling face and tending to urge the table against the chassis.

9. A support device for machining workpieces comprising a first part defining a fixed bed, a second part defining a saddle mounted on the bed to be slidable in a first direction, a third part defining a chassis mounted on the saddle to pivot about a first axis substantially orthogonal to said first direction, a fourth part defining a table mounted on the chassis to be rotatable about a second axis substantially orthogonal to said pivot axis of the chassis, means for relatively moving said parts, locking means for maintaining said parts in given positions relative to each other, and weight compensating means interposed between the chassis and the table and adapted to oppose the forces exerted by the weight of the workpiece carried by the table, the action of said weight compensating means depending on the weight and position of said workpiece and, in particular, on the pivotal position of the chassis, said weight compensating means comprising lightening means comprising groups of fluid motors fixed to one of the parts consisting of the chassis and the table and having piston rods which carry rolling elements adapted to bear and roll against a rolling face carried by the other of said parts consisting of the chassis and the table, said weight compensating means further comprising weighting means which comprise a pair of fluid jacks fixed to one of the parts consisting of the chassis and the table and having piston rods, levers pivotably mounted on said one of said parts consisting of the chassis and the table and having first end portions respectively connected to the piston rods and second end portions, rolling elements respectively carried by the second end portions, a rolling face on the other of said parts consisting of the table and the chassis, said rollers bearing against said rolling face and tending to urge the table against the chassis, means for supplying the weighting fluid jacks with fluid when the inclination of the chassis is at least 60° to the horizontal.

10. A support device for machining workpieces comprising a first part defining a fixed bed, a second part defining a saddle mounted on the bed to be slidable in a first direction, a third part defining a chassis mounted on the saddle to pivot about a first axis substantially orthogonal to said first direction, a fourth part defining a table mounted on the chassis to be rotatable about a second axis substantially orthogonal to said pivot axis of the chassis, means for relatively moving said parts, locking means for maintaining said parts in given positions relative to each other and a mechanism pivoting the chassis to the saddle comprising a shaft fixed with respect to the saddle and carried by two supports having a tapered inner bearing face which is convergent toward the middle of the shaft, the shaft carrying outside said supports respectively two groups of two rolling bearings mounted in opposed relation and having outer bearing rings integral with the chassis.

11. A support device as claimed in claim 10, wherein in the region of one of the supports the shaft has a corresponding tapered shape and, in the region of the other of said supports, the shaft is cylindrical, a sleeve having a cylindrical inner face and a tapered outer face being interposed between the shaft and said second support.

12. A support device for machining workpieces comprising a first part defining a fixed bed, a second part defining a saddle mounted on the bed to be slidable in a first direction, a third part defining a chassis mounted on the saddle to pivot about a first axis substantially orthogonal to said first direction, a fourth part defining a table mounted on the chassis to be rotatable about a second axis substantially orthogonal to said pivot axis of the chassis, means for relatively moving said parts, locking means for maintaining said parts in given positions relative to each other and three main hydraulic circuits connected in parallel with each other, a first of said circuits being adapted to control the feed of the saddle with respect to the bed, a second of said circuits being adapted to control the pivoting feed of the chassis with respect to the saddle, and a third of said circuits being adapted to control the rotational feed of the table with respect to the chassis, each of said main circuits comprising in series a selecting valve, a sequence valve for establishing a regulated pressure value in the corresponding circuit and drive means for producing the corresponding feed.

13. A support device as claimed in claim 12, wherein fluid supply circuits for the locking means are branch connected to the main circuits between the selecting valve and the sequence valve.

14. A support device for machining workpieces comprising a first part defining a fixed bed, a second part defining a saddle mounted on the bed to be slidable in a first direction, a third part defining a chassis mounted on the saddle to pivot about a first axis substantially orthogonal to said first direction, a fourth part defining a table mounted on the chassis to be rotatable about a second axis substantially orthogonal to said pivot axis of the chassis, means for relatively moving said parts, locking means for maintaining said parts in given positions relative to each other, weight compensating means interposed between the chassis and the table and adapted to oppose the forces exerted by the weight of the workpiece carried by the table, the action of said weight compensating means depending on the weight and position of said workpiece and, in particular, on the pivotal position of the chassis, three main hydraulic circuits connected in parallel with each other, a first of said circuits being adapted to control the feed of the saddle with respect to the bed, a second of said circuits being adapted to control the pivoting feed of the chassis with respect to the saddle and a third of said circuits being adapted to control the rotational feed of the table with respect to the chassis, each of said main circuits comprising in series a selecting valve, a sequence valve for establishing a regulated pressure value in the corresponding circuit, drive means for producing the corresponding feed, and supply circuits for the locking means and weight compensating means branch connected to the main circuits between the selecting valve and the sequence valve.

15. A support device as claimed in claim 12, wherein the drive means for producing the feed between the saddle and the bed, between the chassis and the saddle and between the table and the chassis respectively, are each subjected to means responsive to pressure inserted in the main circuit between the selecting valve and the sequence valve.

16. A support device as claimed in claim 13, comprising lightening means interposed between the bed and the saddle and adapted to oppose the forces exerted by the weight of the workpiece carried by the device, the action exerted by said lightening means depending on the weight and position of said workpiece and in particular on the pivot position of the chassis, said lightening means comprising fluid motors and fluid supply circuits branch connected to the main circuits between the selecting valve and the sequence valve and comprising in series a pressure reducer and a three-position distributing valve controlled by an electric control.

17. A support device as claimed in claim 13, comprising weight compensating means interposed between the chassis and the table and adapted to oppose the forces exerted by the weight of the workpiece carried by the table, the action of said weight compensating means depending on the weight and position of said workpiece and, in particular, on the pivotal position of the chassis and said weight compensating means comprising fluid motors and fluid supply circuits branch connected to the main circuits between the selecting valve and the sequence valve and comprising in series a pressure reducer and a three-position distributing valve controlled by an electric control.

18. A support device as claimed in claim 16, comprising a conduit in parallel with the distributing valve which directlyly supplies at least one group of lightening fluid motors.

19. A support device for machining workpieces comprising a first part defining a fixed bed, a second part defining a saddle mounted on the bed to be slidable in a first direction, a third part defining a chassis mounted on the saddle to pivot about a first axis substantially orthogonal to said first direction, a fourth part defining a table mounted on the chassis to be rotatable about a second axis substantially orthogonal to sais pivot axis of the chassis, means for relatively moving said parts, locking means for maintaining said parts in given positions relative to each other, and three main hydraulic circuits connected in parallel with each other, a first of said circuits being adapted to control the feed of the saddle with respect to the bed, a second of said circuits being adapted to control the pivoting feed of the chassis with respect to the saddle and a third of said circuits being adapted to control the rotational feed of the table with respect to the chassis, each of said main circuits comprising in series a selecting valve, a sequence valve for establishing a regulated pressure valve in the corresponding circuit, drive means for producing the corresponding feed, said drive means for pivoting the chassis with respect to the saddle comprising two fluid motors respectively disposed on each side of the saddle, a rapid feedcircuit for supplying fluid to the saddle fluid motors for rapid pivoting of the chassis with respect to the saddle and a slow feed circuit for supplying fluid to the saddle fluid motors for slowly pivoting the chassis with respect to the saddle for positioning purposes.

20. A support device as claimed in claim 19, wherein the rapid feed circuit comprises a three-position distributing valve having an electric control and three branches respectively connecting said distributing valve to two corresponding groups of chambers of the fluid motors, each branch comprising a non-piloted check valve and an electrically piloted retaining valve connected in parallel, and two piloted check valves controlling an inlet and an outlet of the fluid for each of the chambers, the piloted retaining valves being placed in a return path of the fluid between said chambers and the distributing valve and adapted to exert a counter-pressure tending to oppose the return of said fluid under predetermined conditions and in particular when the effect of the weight of the workpiece on the chassis and the table tends to accentuate the pivoting movement, and piloted by position detectors actuated by the chassis to open and no longer exert said counter-pressure when the effect of the weight of the workpiece tends to oppose the pivoting movement produced by the fluid motors.

21. A support device as claimed in claim 20, wherein the slow-feed circuit comprises in series a flow regulator and a three-position distributing valve having an electric control respectively connected to two branches of the rapid-feed circuit at points located between the chambers of the fluid motors and the associated check valves.

22. A support device for machining a workpiece, comprising a first part defining a fixed bed, a second part defining a saddle, guide means interposed between the saddle and the bed for supporting the saddle on the bed for movement in a first direction, a third part defining a chassis mounted on the saddle to pivot about a first axis substantially orthogonal to said first direction and a fourth part defining a table for receiving and holding the workpiece, guide means interposed between the table and the chassis for supporting the table on the chassis for rotation about a second axis substantially orthogonal to said pivot axis of the chassis, hydraulic means for relatively moving the four parts, releasable locking means for maintaining said parts in desired positions relative to each other, a plurality of lightening means in a plurality of spaced-apart regions and interposed between the saddle and the bed and between the table and the chassis, each lightening means being hydraulic jack means capable of exerting a force in a direction for biasing the saddle away from the bed and the table away from the chassis, and hydraulic control means connected to the hydraulic jack means for varying the force exerted by the jack means substantially as a function of forces exerted substantially in said regions through said first and second guide means due to the weight and position of the workpiece relative to said four parts.

23. A device as claimed in claim 22, wherein said hydraulic control means comprise position detecting means associated with the chassis and responsive to changes in angular position of the chassis about said first axis, hydraulic valve means for controlling actuation of said jack means and associated with said position detective means so that the angular position of the chassis about said first axis determines in which of said regions said hydraulic jack means are operative.

* * * * *